(12) United States Patent
Kato et al.

(10) Patent No.: US 12,441,216 B2
(45) Date of Patent: Oct. 14, 2025

(54) CAR SICKNESS INHIBITION DEVICE, METHOD, STORAGE MEDIUM, AND VEHICLE SEAT

(71) Applicant: NHK SPRING CO., LTD., Yokohama (JP)

(72) Inventors: Kazuhito Kato, Yokohama (JP); Kousuke Suzuki, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 546 days.

(21) Appl. No.: 17/935,872

(22) Filed: Sep. 27, 2022

(65) Prior Publication Data

US 2023/0114061 A1    Apr. 13, 2023

(30) Foreign Application Priority Data

Oct. 8, 2021 (JP) ................. 2021-166452

(51) Int. Cl.
*B60N 2/24* (2006.01)
*B60N 2/00* (2006.01)
*B60N 2/90* (2018.01)

(52) U.S. Cl.
CPC ............ *B60N 2/24* (2013.01); *B60N 2/0028* (2023.08); *B60N 2/90* (2018.02); *B60N 2/003* (2023.08); *B60N 2002/981* (2018.02); *B60N 2210/30* (2023.08); *B60N 2220/10* (2023.08); *B60N 2220/20* (2023.08)

(58) Field of Classification Search
CPC .......... B60N 2/24; B60N 2/0028; B60N 2/90; B60N 2/003; B60N 2002/981; B60N 2210/30; B60N 2220/10; B60N 2220/20; B60N 2/0268; B60N 2/0272; B60N 2/22; B60N 2/838; B60N 2/2222
See application file for complete search history.

(56) References Cited

U.S. PATENT DOCUMENTS

| 11,932,263 | B2 * | 3/2024 | Moriura | ................ A61B 5/1116 |
| 2019/0184867 | A1 * | 6/2019 | Ketels | .................... B60N 2/502 |

FOREIGN PATENT DOCUMENTS

| CN | 113741201 A | * | 12/2021 | |
| CN | 111295307 B | * | 8/2022 | .......... B60G 17/016 |
| DE | 102020205333 A1 | * | 10/2021 | |
| DE | 102020117429 A1 | * | 1/2022 | |
| JP | 2009067169 A | * | 4/2009 | |
| JP | 2011-020539 A | | 2/2011 | |
| WO | WO-2023145168 A1 | * | 8/2023 | .......... B60W 30/025 |

* cited by examiner

*Primary Examiner* — Jacob S. Scott
(74) *Attorney, Agent, or Firm* — Knobbe, Martens, Olson & Bear, LLP

(57) ABSTRACT

A car sickness inhibition device includes: a memory and a processor connected to the memory, the processor being configured to: acquire an acceleration a in a front-rear direction of a vehicle or angles of inclination θ of the head and upper body of an occupant sitting in a seat of the vehicle; and by using expression $θ > \tan^{-1}(a/g) \cdot (1)$, where g denotes gravitational acceleration, obtain from the acquired acceleration a an angle of inclination θ0 with which car sickness is inhibited, or obtain an acceleration a0 with which car sickness is inhibited.

13 Claims, 15 Drawing Sheets

FIG.4

| POSTURE OF OCCUPANT | | ANGLES OF SEAT | | |
|---|---|---|---|---|
| ANGLE OF INCLINATION OF HEAD | ANGLE OF INCLINATION OF UPPER BODY | RECLINING ANGLE | ARTICULATED ANGLE | HEADREST ANGLE |
| $\theta$ head_1 | $\theta$ upper body_1 | $\phi 1\_1$ | $\phi 2\_1$ | $\phi 3\_1$ |
| $\theta$ head_2 | $\theta$ upper body_2 | $\phi 1\_2$ | $\phi 2\_2$ | $\phi 3\_2$ |
| $\theta$ head_3 | $\theta$ upper body_3 | $\phi 1\_3$ | $\phi 2\_3$ | $\phi 3\_3$ |
| ⋮ | ⋮ | ⋮ | ⋮ | ⋮ |

46

CASE WHERE HEAD SEPARATES FROM HEADREST →
RESULTANT FORCE IS LARGE

CASE WHERE HEAD DOES NOT SEPARATE FROM HEADREST →
RESULTANT FORCE IS SMALL

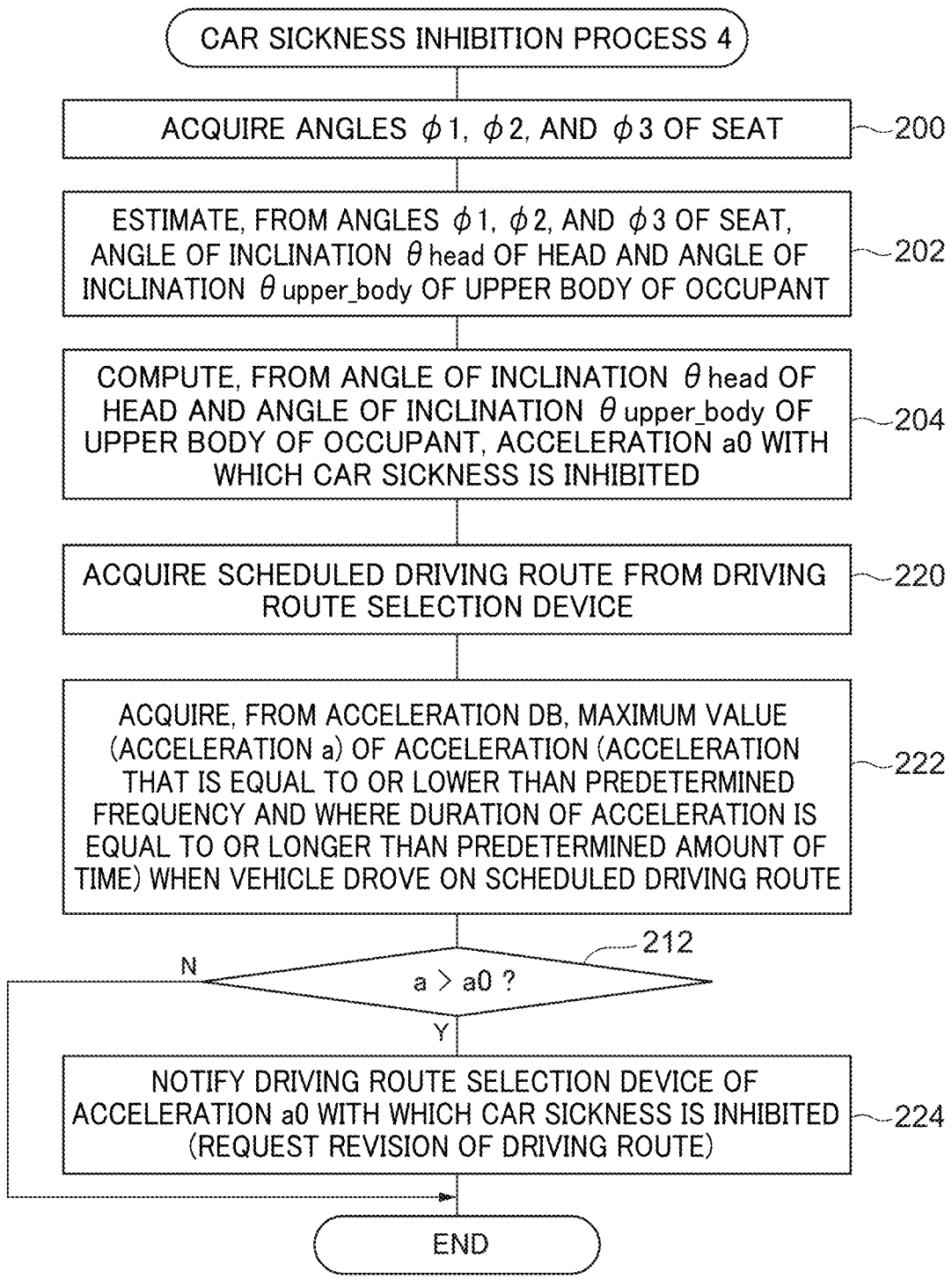

CAR SICKNESS INHIBITION DEVICE, METHOD, STORAGE MEDIUM, AND VEHICLE SEAT

CROSS-REFERENCE TO RELATED APPLICATION

This application is based on and claims priority under 35 USC 119 from Japanese Patent Application No. 2021-166452 filed on Oct. 8, 2021, the disclosure of which is incorporated by reference herein.

BACKGROUND

Technical Field

The present disclosure relates to a car sickness inhibition device, a car sickness inhibition method, a storage medium storing a car sickness inhibition program, and a vehicle seat.

Related Art

Japanese Patent Application Laid-open (JP-A) No. 2011-20539 discloses a technology that detects driving conditions of a vehicle, such as right and left turns, acceleration and deceleration, and acceleration in the vertical, right and left, and front and rear directions of the vehicle, and, when there is an acceleration equal to or greater than a reference value, displays a video in which a video message is superposed on top of television, VTR, DVD, game, or other video content.

Generally, because people perceive acceleration with the otolith in their heads, a displacement of the head of a person when an acceleration acts thereon causes car sickness. The present inventors arrived at the fact that whether or not the head of a person is displaced when an acceleration acts thereon depends on the posture of the person—specifically, the angles of inclination of the head and upper body (chest) of the person—when the acceleration acts thereon. With respect to this, JP-A No. 2011-20539 determines cases where an acceleration equal to or greater than the reference value acts as cases where car sickness tends to occur without considering the posture of the occupant when an acceleration acts thereon, and thus has room for improvement in relation to the accuracy of discriminating whether or not car sickness will occur.

SUMMARY

The present disclosure has been made in view of the above circumstances and provides a car sickness inhibition device, a car sickness inhibition method, a storage medium storing a car sickness inhibition program, and a vehicle seat that may accurately obtain a condition for discriminating whether or not an occupant sitting in a seat of a vehicle will become carsick.

A first aspect of the disclosure is a car sickness inhibition device including a memory and a processor connected to the memory, the processor being configured to: acquire an acceleration a in a front-rear direction of a vehicle or angles of inclination θ of the head and upper body of an occupant sitting in a seat of the vehicle; and by using expression (1) below, $$\theta > \tan^{-1}(a/g) \quad (1)$$

where g denotes gravitational acceleration, obtain from the acquired acceleration a an angle of inclination θ0 with which car sickness is inhibited or obtain an acceleration a0 with which car sickness is inhibited.

The present inventors obtained the above expression (1) as a conditional expression with which the head of an occupant does not become displaced when an acceleration a in the front-rear direction of the vehicle acts on the occupant sitting in the seat of the vehicle and whose head and upper body are inclined by angles θ (details are described below). The first aspect acquires the acceleration a in the front-rear direction of the vehicle or the angles of inclination θ of the head and upper body of the occupant sitting in the seat of the vehicle. The first aspect also uses the above expression (1) to obtain from the acceleration a the angle of inclination θ0 with which car sickness is inhibited, or to obtain from the angles of inclination θ the acceleration a0 with which car sickness is inhibited. Consequently, according to the first aspect, a condition (the angle of inclination θ0 with which car sickness is inhibited or the acceleration a0 with which car sickness is inhibited) for discriminating whether or not the occupant sitting in the seat of the vehicle will become carsick may be accurately obtained.

A second aspect is the first aspect, wherein the processor is configured to acquire, as the acceleration a, a component of acceleration in the front-rear direction of the vehicle that is equal to or lower than a predetermined frequency.

Car sickness occurs as a result of mainly low-frequency displacements out of displacements of the head of a person. The second aspect acquires, as the acceleration a, a component of acceleration in the front-rear direction of the vehicle that is equal to or lower than a predetermined frequency, so a value having a higher correlation with car sickness of the occupant may be obtained as the acceleration a.

A third aspect is the first aspect or the second aspect, wherein the processor is configured to acquire, as the acceleration a, a component of acceleration in the front-rear direction of the vehicle where the duration of acceleration is equal to or greater than a predetermined amount of time.

The present inventors confirmed by experiment that whether or not the head of a person becomes displaced when an acceleration acts thereon depends on the duration of the acceleration and, as the duration increases, the head becomes more likely to be displaced and the person becomes more likely to feel carsick. The third aspect acquires, as the acceleration a, a component of acceleration in the front-rear direction of the vehicle where the duration of acceleration is equal to or greater than a predetermined amount of time, so a value having a higher correlation with car sickness of the occupant may be obtained.

A fourth aspect is any of the first aspect to the third aspect, wherein the processor is further configured to: estimate the angles of inclination θ of the occupant sitting in the seat from angles of the seat, and determine whether or not the estimated angles of inclination θ satisfy the expression (1) to which the acquired acceleration a has been assigned.

The fourth aspect estimates the angles of inclination θ of the occupant sitting in the seat from the angles of the seat, so the device configuration may be simplified compared to an aspect where, for example, the angles of inclination θ are detected with sensors. Additionally, whether or not the estimated angles of inclination θ are within the range of the angle of inclination θ0 with which car sickness is inhibited may be determined by a simple process.

A fifth aspect is any of the first aspect to the fourth aspect, wherein the processor is further configured to provide guidance for adjustment of angles of the seat by the occupant so that the angles of inclination θ of the head and upper body of the occupant sitting in the seat of the vehicle each become equal to or greater than the obtained angle of inclination θ0 with which car sickness is inhibited.

In the fifth aspect, guidance is provided for adjustment of the angles of the seat by the occupant so that the angles of the seat become the angle with which car sickness is inhibited, so the occupant sitting in the seat of the vehicle may be inhibited from becoming carsick.

A sixth aspect is any of the first aspect to the fourth aspect, wherein the processor is further configured to control adjustment of angles of the seat by seat angle adjustment devices so that the angles of inclination θ of the head and upper body of the occupant sitting in the seat of the vehicle each become equal to or greater than the obtained angle of inclination θ0 with which car sickness is inhibited.

In the sixth aspect, adjustment of the angles of the seat by the seat angle adjustment devices is controlled so that the angles of the seat become the angle with which car sickness is inhibited, so the occupant sitting in the seat of the vehicle may be inhibited from becoming carsick.

A seventh aspect is the first aspect, wherein the processor is further configured to: acquire angles of the seat, and acquire the angles of inclination θ of the occupant sitting in the seat by estimating the angles of inclination θ of the occupant sitting in the seat from the acquired angles of the seat.

The seventh aspect estimates the angles of inclination θ of the occupant sitting in the seat from the angles of the seat, so the device configuration may be simplified compared to an aspect where, for example, the angles of inclination θ are detected with sensors.

An eighth aspect is the fourth aspect or the seventh aspect, further including a storage unit that stores relationships between angles of the seat and the angles of inclination θ of the head and upper body of the occupant sitting in the seat, wherein the processor is configured to estimate the angles of inclination θ of the occupant sitting in the seat from the angles of the seat based on information stored in the storage unit.

The eighth aspect estimates the angles of inclination θ based on the relationships, stored in the storage unit, between the angles of the seat and the angles of inclination θ of the head and upper body of the occupant sitting in the seat, so the process becomes simple compared to a case where the above relationships are prescribed in advance by a computational expression or the like.

A ninth aspect is any of the first aspect, the seventh aspect, or the eighth aspect, wherein the processor is further configured to issue a notification in a case in which acceleration in the front-rear direction of the vehicle being driven by the occupant is greater than the obtained acceleration a0 with which car sickness is inhibited.

In the ninth aspect, a notification is issued when acceleration in the front-rear direction of the vehicle as the vehicle is being driven by the occupant is equal to or greater than the acceleration a0 with which car sickness is inhibited, so the driver is induced to drive the vehicle so that acceleration in the front-rear direction of the vehicle becomes less than the acceleration a0. Because of this, the occupant sitting in the seat of the vehicle may be inhibited from becoming carsick.

A tenth aspect is any of the first aspect, the seventh aspect, or the eighth aspect, wherein the processor is further configured to notify a driving route selection device of the acceleration a0 with which car sickness is inhibited so that a driving route where acceleration in the front- and rear direction of the vehicle during driving becomes equal to or less than the acceleration a0 with which car sickness is inhibited is selected as the driving route of the vehicle.

In the tenth aspect, the driving route selection device is notified of the acceleration a0 with which car sickness is inhibited so that a driving route where acceleration in the front-rear direction of the vehicle during driving becomes less than the acceleration a0 is selected, so the occupant sitting in the seat of the vehicle may be inhibited from becoming carsick.

A vehicle seat pertaining to an eleventh aspect includes a seat body in which an occupant of a vehicle sits and the car sickness inhibition device of any of the first aspect to the tenth aspect.

According to the eleventh aspect, as in the first aspect, a condition for discriminating whether or not the occupant sitting in the seat of the vehicle will become carsick may be accurately obtained.

A twelfth aspect is a car sickness inhibition method including acquiring an acceleration a in a front-rear direction of a vehicle or angles of inclination θ of the head and upper body of an occupant sitting in a seat of the vehicle; and by using expression (1) below, $$\theta > \tan^{-1}(a/g) \qquad (1)$$

where g denotes gravitational acceleration, obtaining from the acquired acceleration a an angle of inclination θ0 with which car sickness is inhibited or obtaining from the acquired angles of inclination θ an acceleration a0 with which car sickness is inhibited.

According to the twelfth aspect, as in the first aspect, a condition for discriminating whether or not the occupant sitting in the seat of the vehicle will become carsick may be accurately obtained.

A thirteenth aspect is a non-transitory storage medium storing a program that causes a computer to execute a car sickness inhibition processing, the car sickness inhibition processing including: acquiring an acceleration a in a front-rear direction of a vehicle or angles of inclination θ of the head and upper body of an occupant sitting in a seat of the vehicle; and by using expression (1) below, $$\theta > \tan^{-1}(a/g) \qquad (1)$$

where g denotes gravitational acceleration, obtaining from the acquired acceleration a an angle of inclination θ0 with which car sickness is inhibited or obtaining from the acquired angles of inclination θ an acceleration a0 with which car sickness is inhibited.

According to the thirteenth aspect, as in the first aspect, a condition for discriminating whether or not the occupant sitting in the seat of the vehicle will become carsick may be accurately obtained.

The present disclosure may accurately obtain a condition for discriminating whether or not an occupant sitting in a seat of a vehicle will become carsick.

BRIEF DESCRIPTION OF THE DRAWINGS

FIG. 4 is a diagram showing an example of a conversion table;

FIG. 15 is a flowchart showing a car sickness inhibition process 4 pertaining to the fourth embodiment.

DETAILED DESCRIPTION

Examples of embodiments of the disclosure will be described in detail below with reference to the drawings.

First Embodiment

Figure 1:
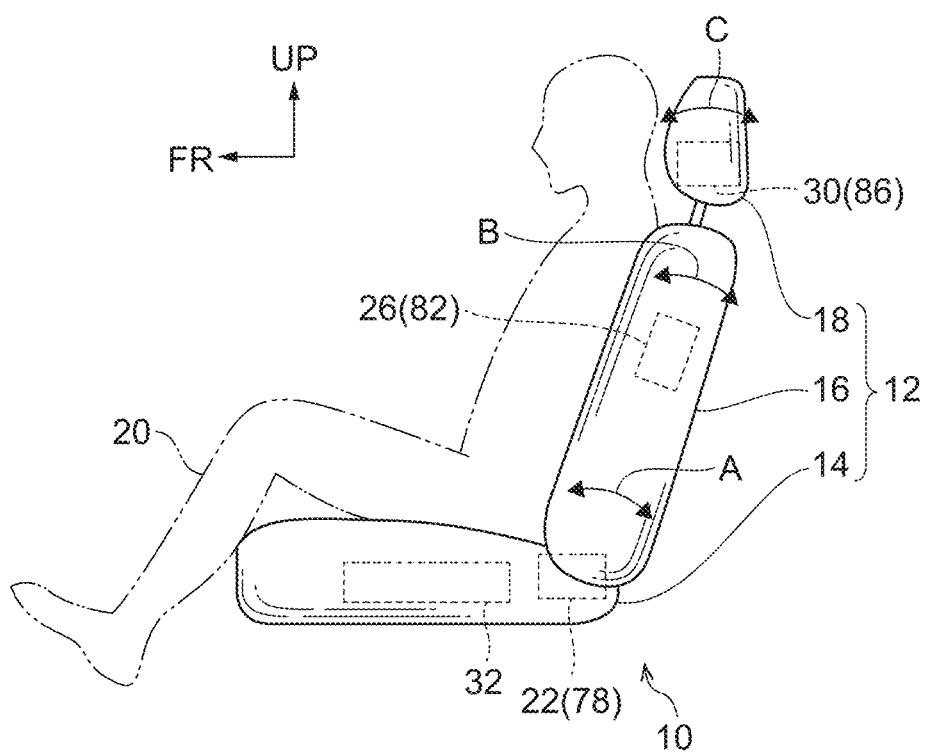
FIG. 1 is a side view of a vehicle seat pertaining to embodiments.

A vehicle seat 10 shown in FIG. 1 includes a seat body 12. In this embodiment, the seat body 12 is provided in a front passenger seat inside a cabin of a vehicle and is sat in by an occupant 20 of the front passenger seat of the vehicle. The seat body 12 includes a seat cushion portion 14, a seatback portion 16, and a headrest portion 18.

The vehicle vertical direction lower end portion of the seatback portion 16 is attached to the vehicle front-rear direction rear end portion of the seat cushion portion 14 via a reclining mechanism 22, and the seatback portion 16 is rotatable about an axis (i.e., the direction of arrow A in FIG. 1) along the vehicle width direction relative to the seat cushion portion 14. The reclining mechanism 22 includes a reclining angle φ1 sensor 24 (see FIG. 2) that detects the angle (reclining angle φ1) of the seatback portion 16 relative to the seat cushion portion 14.

In the vehicle vertical direction middle portion of the seatback portion 16, an articulating mechanism 26 that interconnects the upper portion and the lower portion of the seatback portion 16 is disposed. The upper portion of the seatback portion 16 is rotatable about an axis (i.e., the direction of arrow B in FIG. 1) along the vehicle width direction relative to the lower portion of the seatback portion 16. The articulating mechanism 26 includes an articulated angle φ2 sensor 28 (see FIG. 2) that detects the angle (articulated angle φ2) of the upper portion of the seatback portion 16 relative to the lower portion of the seatback portion 16.

The headrest portion 18 is attached, so as to be slidingly movable along the length direction of the seatback portion 16, to the vehicle vertical direction upper end portion of the seatback portion 16. The headrest portion 18 has a built-in headrest mechanism 30, and the headrest portion 18 is rotatable about an axis (i.e., the direction of arrow C in FIG. 1) along the vehicle width direction relative to the upper portion of the seatback portion 16. The headrest mechanism 30 includes a headrest angle φ3 sensor 31 (see FIG. 2) that detects the angle (headrest angle (φ3)) of the headrest portion 18 relative to the upper portion of the headrest portion 16.

Figure 2:
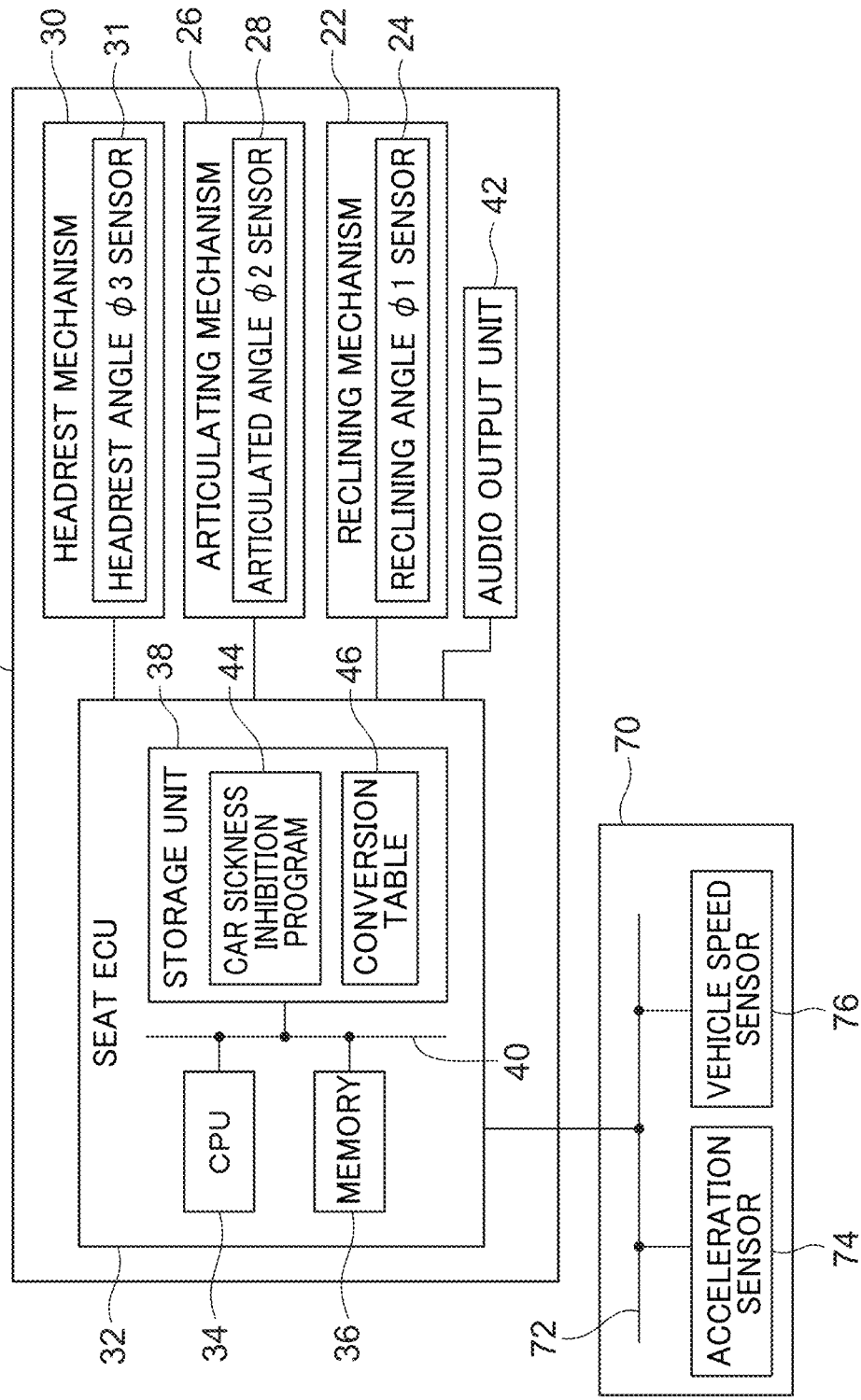
FIG. 2 is a block diagram showing general configurations of a seat ECU and peripherals pertaining to the first embodiment.

The vehicle seat 10 also includes a seat electronic control unit (ECU) 32, and the seat ECU 32 is housed inside the seat cushion portion 14. As shown in FIG. 2, the seat ECU 32 includes a central processing unit (CPU) 34 that corresponds to a processor, a memory 36 such as a read-only memory (ROM) or a random-access memory (RAM), and a nonvolatile storage unit 38 such as a hard disk drive (HDD) and/or a solid-state drive (SSD). The CPU 34, the memory 36, and the storage unit 38 are communicably connected to each other via an internal bus 40.

Connected to the seat ECU 32 are the reclining angle φ1 sensor 24 of the reclining mechanism 22, the articulated angle (φ2 sensor 28 of the articulating mechanism 26, and the headrest angle φ3 sensor 31 of the headrest mechanism 30 (see FIG. 2). The seat ECU 32 constantly obtains the reclining angle φ1, the articulated angle (φ2, and the headrest angle φ3 by constantly monitoring the outputs of the reclining angle φ1 sensor 24, the articulated angle (φ2 sensor 28, and the headrest angle φ3 sensor 31.

Also connected to the seat ECU 32 are an audio output unit 42 including speakers provided inside the cabin of the vehicle and a system bus 72 of an in-vehicle system 70 provided in the vehicle. Connected to the system bus 72 of the in-vehicle system 70 are an acceleration sensor 74 that detects acceleration at least in the front-rear direction of the vehicle and a vehicle speed sensor 76 that detects the vehicle speed of the vehicle.

Figure 3:
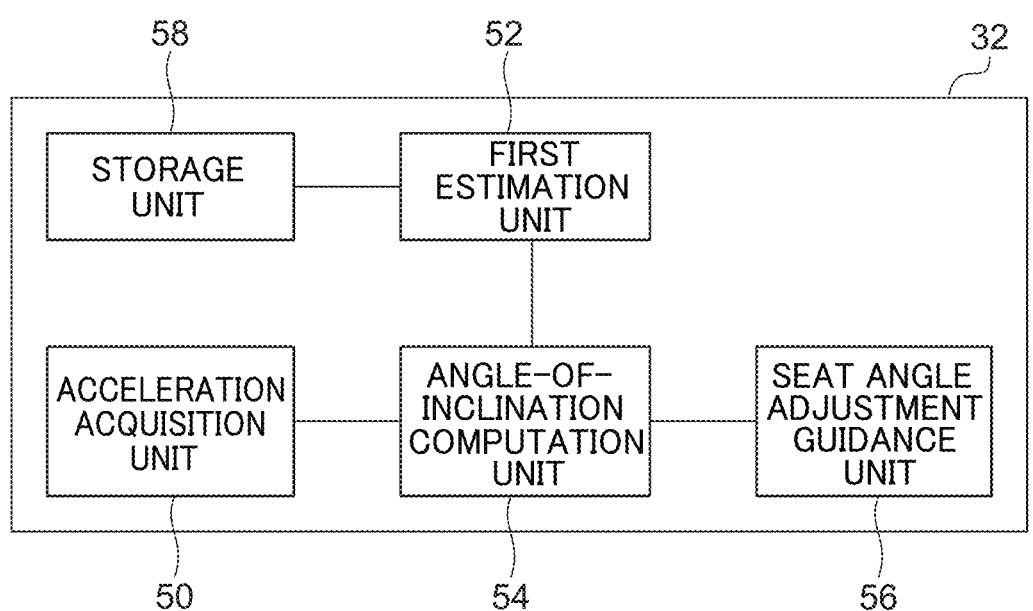
FIG. 3 is a functional block diagram of the seat ECU pertaining to the first embodiment.

The storage unit 38 of the seat ECU 32 stores a car sickness inhibition program 44 and a conversion table 46. In the first embodiment, the seat ECU 32 functions as the functional units shown in FIG. 3 as a result of the car sickness inhibition program 44 pertaining to the first embodiment being read from the storage unit 38 and loaded to the memory 36 and then the car sickness inhibition program 44 that has been loaded to the memory 36 being executed by the CPU 34. That is, in the first embodiment, the seat ECU 32 functions as an acceleration acquisition unit 50, a first estimation unit 52, an angle-of-inclination computation unit 54, and a seat angle adjustment guidance unit 56. Furthermore, the storage unit 38 of the seat ECU 32 storing the conversion table 46 functions as a storage unit 58 shown in FIG. 3.

The acceleration acquisition unit 50 acquires an acceleration a in the front-rear direction of the vehicle. The acceleration acquisition unit 50 is an example of an acquisition unit in the present disclosure. The first estimation unit 52 estimates an angle of inclination θhead of the head and an angle of inclination θupper_body of the upper body of the occupant sitting in the seat body 12 from the angles of the seat body 12 (the reclining angle φ1, the articulated angle φ2, and the headrest angle φ3).

The estimation of the angles of inclination θhead and θupper body by the first estimation unit 52 is performed based on the conversion table 46 stored in the storage unit 58. As shown in FIG. 4, in the conversion table 46, the angles φ1, φ2, and φ3 of the seat body 12 are stored in association with the angles of inclination θhead and θupper_body of the head and upper body of the occupant sitting in the seat body 12 when the seat body 12 has been adjusted to the angles φ1, φ2, and φ3.

The angle-of-inclination computation unit 54 performs the computational process of expression (1) below, $$\theta > \tan^{-1}(a/g) \quad (1)$$

where g denotes gravitational acceleration, to obtain, from the acceleration a in the front-direction of the vehicle acquired by the acceleration acquisition unit 50, an angle of inclination θ0 in which car sickness is inhibited. The angle-of-inclination computation unit 54 also performs a process to determine whether or not the angles of inclination θhead and θupper_body estimated by the first estimation unit 52 satisfy the expression (1) to which the acceleration a acquired by the acceleration acquisition unit 50 has been assigned. The angle-of-inclination computation unit 54 is an example of a computation unit in the present disclosure.

The seat angle adjustment guidance unit 56 provides guidance for adjustment of the angles of the seat body 12 by the occupant so that the angles of inclination θhead and θupper_body of the head and upper body of the occupant sitting in the seat body 12 of the vehicle each become equal to or greater than the angle of inclination θ0 with which car sickness is inhibited obtained by the angle-of-inclination computation unit 54. The seat angle adjustment guidance unit 56 is an example of a guidance unit in the present disclosure, and the seat ECU 12 is an example of a car sickness determination device pertaining to the present disclosure.

Figure 5A:
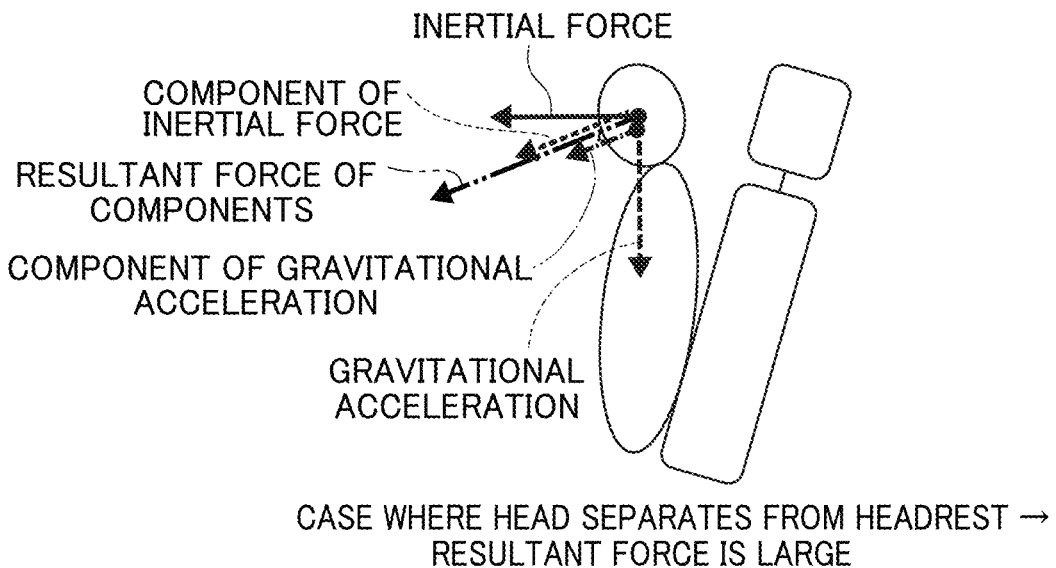
FIG. 5A is an explanatory diagram for describing the action of expression (1) in the present disclosure.

Next, as the action of the first embodiment, expression (1) in the present disclosure will first be described. Consider a case where an acceleration in the direction of deceleration acts on the vehicle in a state in which the occupant is sitting in the seat body 12. Here, as shown in FIG. 5A, when the head of the occupant separates from the headrest portion 18 and becomes displaced in the vehicle forward direction, a resultant force comprising the sum of the component of inertial force (i.e., the acceleration in the direction of deceleration) and the component of gravitational acceleration acts in the front-rear direction of the head on the head of the occupant, so a greater acceleration occurs (i.e., resultant force of components is large).

Figure 5B:
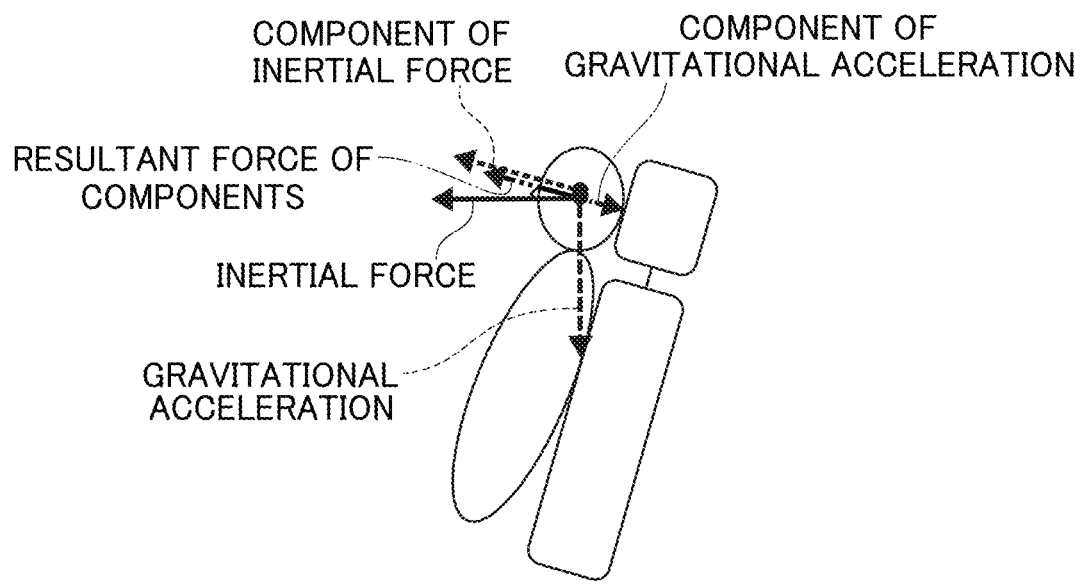
FIG. 5B is an explanatory diagram for describing the action of expression (1) in the present disclosure.

In contrast, as shown in FIG. 5B, if the head of the occupant does not separate from the headrest portion 18 when an acceleration in the direction of deceleration acts on the vehicle, the acceleration in the front-rear direction of the head that acts on the head of the occupant, which causes car sickness, is inhibited (i.e., resultant force of components is small) and thus car sickness may be inhibited. Additionally, whether or not displacement in which the head of the occupant separates from the headrest portion 18 occurs when an acceleration in the direction of deceleration acts on the vehicle depends on the posture of the occupant—specifically, the angles of inclination θ of the head and upper body of the occupant—when the acceleration acts thereon.

Figure 6:
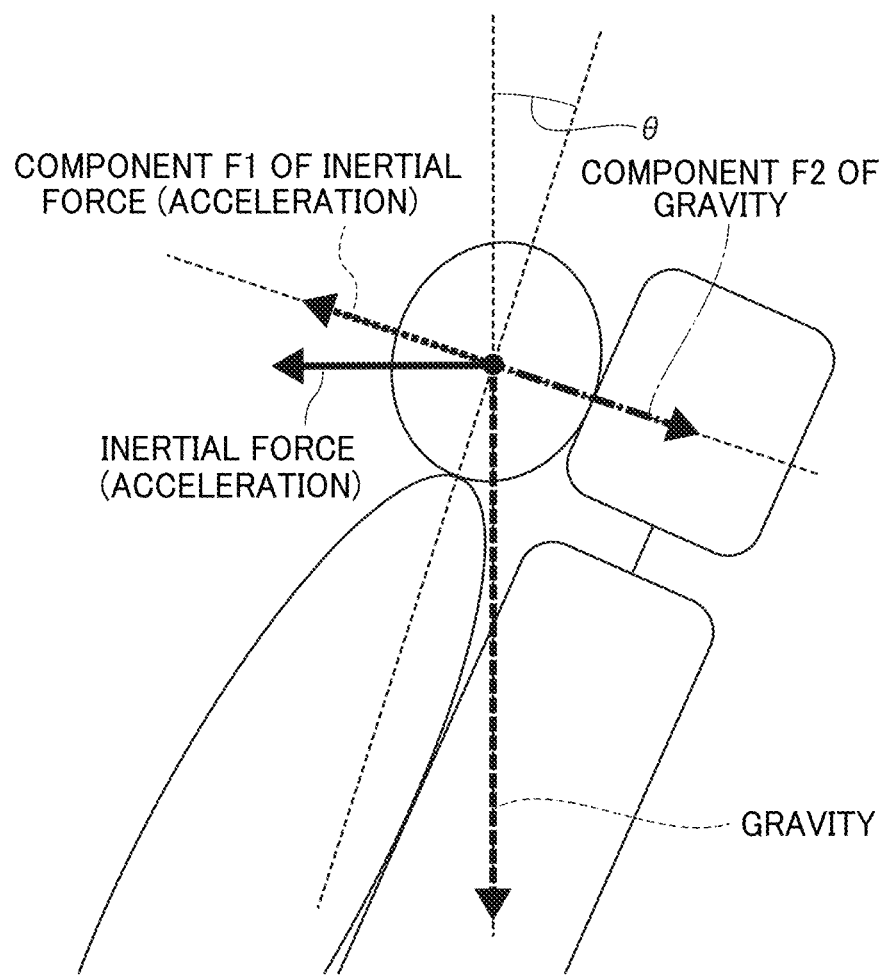
FIG. 6 is an explanatory diagram for describing the action of expression (1) in the present disclosure.

As shown in FIG. 6, let it be assumed that F1 and F2 denote components of inertial force and gravity, respectively, in the front-rear direction of the head. When the component F1 of inertial force is smaller than the component F2 of gravity, expression (0) below holds because it is thought that the head will not separate from the headrest portion 18.

$$F1 < F2 \quad (0)$$

When expression (0) is rewritten with a denoting inertial force (acceleration) in the direction of deceleration, g denoting gravitational acceleration, m denoting the mass of the head, and θ denoting the angle of inclination of the head of the occupant, and the expression is solved, and the above expression (1) is obtained.

$$m \cdot a \cdot \cos\theta < m \cdot g \cdot \sin\theta$$

$$(a/g) < \tan\theta$$

Although FIG. 6 shows the head of the occupant, the same line of thought as the head also applies to the upper body, so that the angle of inclination θ in expression (1) also holds in the case of the angle of inclination of the upper body of the occupant. By adjusting the angles of the head and upper body in accordance with expression (1), the head of the occupant is inhibited from separating from the headrest portion 18 when an inertial force (i.e., acceleration) in the direction of deceleration occurs. The angle of inclination θ in expression (1) is an angle inclined in the vehicle rearward direction from the vertical direction (see also FIG. 8).

Figure 7:
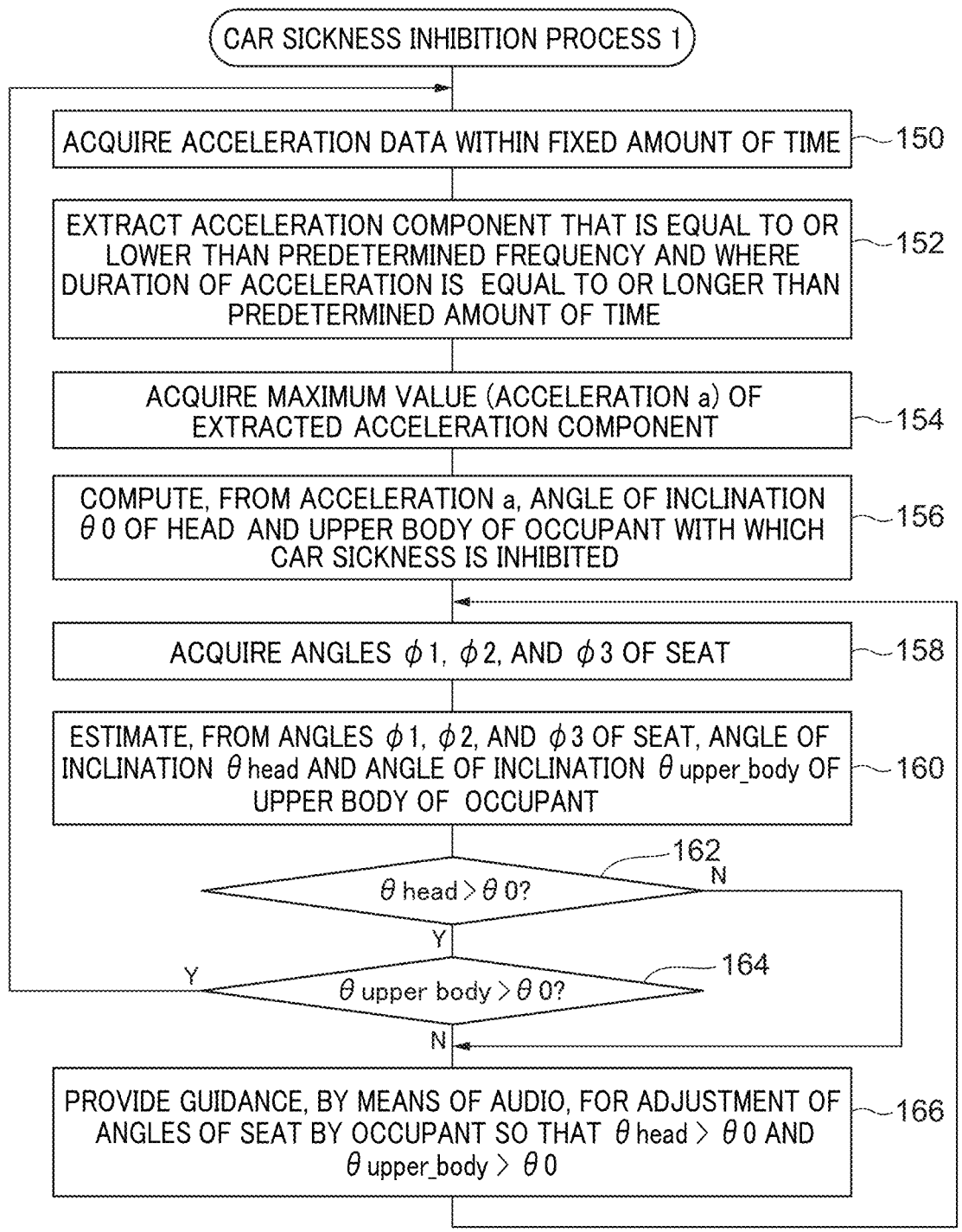
FIG. 7 is a flowchart showing a car sickness inhibition process 1 pertaining to the first embodiment.

Next, a car sickness inhibition process 1 executed by the seat ECU 32 pertaining to the first embodiment while the ignition switch of the vehicle is on will be described with reference to FIG. 7.

In step 150 of the car sickness inhibition process 1, the acceleration acquisition unit 50 acquires acceleration data within a fixed amount of time from the acceleration sensor 74. Instead of acquiring the acceleration data from the acceleration sensor 74, the acceleration acquisition unit 50 may also acquire vehicle speed data within a fixed amount of time from the vehicle speed sensor 76 and calculate the acceleration data by differentiating the vehicle speed data it has acquired. The fixed amount of time in step 150 is, for example, an amount of time equal to or greater than a duration of acceleration described later.

In step 152, the acceleration acquisition unit 50 extracts, from the acceleration data acquired in step 150, an acceleration component that is equal to or lower than a predetermined frequency and where the duration of acceleration is equal to or greater than a predetermined amount of time. For example, as the predetermined frequency, for example, 2 [Hz] may be applied, and as the predetermined amount of time, for example, 0.2 to 0.6 [seconds] may be applied. Because of this, an acceleration component having a higher correlation with car sickness of the occupant may be obtained.

In regard to the duration of acceleration, its appropriate value will differ depending on the values of the angles of inclination θhead and θupper_body of the head and upper body of the occupant. For this reason, the present disclosure is not limited to using a fixed value for the threshold value (i.e., the predetermined value) of the duration of acceleration, and the relationships between the angles of inclination θhead and θupper_body of the head and upper body of the occupant and the duration of acceleration may be stored in advance in the form of a function or a table, with the duration of acceleration being varied depending on the angles of inclination θhead and θupper_body of the head and upper body of the occupant.

In step 154, the acceleration acquisition unit 50 acquires the maximum value (=acceleration a) of the acceleration component extracted in step 152. In step 156, the angle-of-inclination computation unit 54 assigns the acceleration a acquired in step 154 to expression (1) and performs the computational process of expression (1) to obtain the angle of inclination θ0 with which car sickness is inhibited. In step 158, the first estimation unit 152 acquires the current reclining angle φ1, articulated angle 92, and headrest angle φ3 of the seat body 12, which are constantly obtained by the seat ECU 32.

In step 160, the first estimation unit 52 estimates, from the current angles φ1, φ2, and φ3 of the seat body 12 acquired in step 158, the current angle of inclination θhead of the head and the current angle of inclination θupper_body of the upper body of the occupant. This estimation of the current angles of inclination θhead and θupper_body may be performed by reading, from the conversion table 46 stored in the storage unit 58, the angles of inclination θhead and θupper_body associated with the current angles φ1, φ2, and φ3 of the seat body 12.

In step 162, the angle-of-inclination computation unit 54 determines whether or not the current angle of inclination θhead of the head of the occupant is greater than the angle of inclination θ0 with which car sickness is inhibited. In a case in which the determination in step S162 is YES, the process moves to step 164. In step 164, the angle-of-inclination computation unit 54 determines whether or not the current angle of inclination θupper_body of the upper body of the occupant is greater than the angle of inclination θ0 with which car sickness is inhibited.

The reason for determining whether or not the angle of inclination θhead of the head and the angle of inclination θupper_body of the upper body of the occupant are each greater than the angle of inclination θ0 with which car sickness is inhibited as described above is as follows. That is, in a case where just the angle of inclination of the upper body of the occupant is greater than the angle of inclination θ0 (i.e., a case that satisfies expression (1)), the potential is high that the head of the occupant will separate from the headrest portion 18 when the acceleration a acts thereon. Furthermore, in a case where just the angle of inclination of the head of the occupant is greater than the angle of inclination θ0 (i.e., a case that satisfies expression (1)), the potential is high that the upper body of the occupant will separate from the seatback portion 16 when the acceleration a acts thereon, resulting in the head of the occupant being pulled by the upper body and also separating from the headrest portion 18.

In a case in which the determinations in step 162 and step 164 are each YES, it may be judged that the head of the occupant will not separate from the headrest portion 18 even if the acceleration a acts thereon, so the process returns to step 150. In this case, adjustment of the angles φ1, φ2, and φ3 of the seat body 12 is not performed. However, in a case in which the determination in step 162 or step 164 is NO, the potential is high that the head of the occupant will separate from the headrest portion 18 when the acceleration a acts, so the process moves to step 166.

In step 166, the seat angle adjustment guidance unit 56 provides guidance for adjustment of the angles of the seat by the occupant by outputting audio from the audio output unit 42 so that the angle of inclination θhead of the head of the occupant becomes greater than the angle of inclination θ0 and the angle of inclination θupper_body of the upper body of the occupant becomes greater than the angle of inclination θ0.

As an example, the seat angle adjustment guidance unit 56 references the conversion table 46 stored in the storage unit 58 and extracts, as target angles, a combination of the angles φ1, φ2, and φ3 of the seat body 12 when the angles of inclination θhead and θupper_body become equal to greater than the angle of inclination θ0. If more than one combination of the angles φ1, φ2, and φ3 are extracted, it is preferable to select, as the target angles, the combination whose differences from the current angles φ1, φ2, and φ3 of the seat body 12 are as small as possible.

Next, based on the target angles, the seat angle adjustment guidance unit 56 outputs audio such as, for example, "Please increase the reclining angle (or the articulated angle or the headrest angle) to prevent car sickness," in a state in which the vehicle is stopped, for example. This prompts the occupant to perform an operation to adjust the reclining angle φ1 via the reclining mechanism 22, or an operation to adjust the articulated angle φ2 via the articulating mechanism 26, or an operation to adjust the headrest angle φ3 via the headrest mechanism 30.

After the angle adjustment operation is performed by the occupant, the process returns to step 158, and in step 158 to step 164, it is again determined whether or not the angles of inclination θhead and θupper_body of the occupant are greater than the angle of inclination θ0 in the seat body 12 that has undergone the angle adjustment operation. If the determination in step 162 or step 164 is NO, the process of step 166 is again performed and the angle adjustment operation by the occupant is again performed. On the other hand, if the determinations in step 162 and step 164 are YES, the seat angle adjustment guidance unit 56 notifies the occupant that the angle adjustment operation is complete by outputting audio such as, for example, "Seat adjustment is complete."

Figure 8:
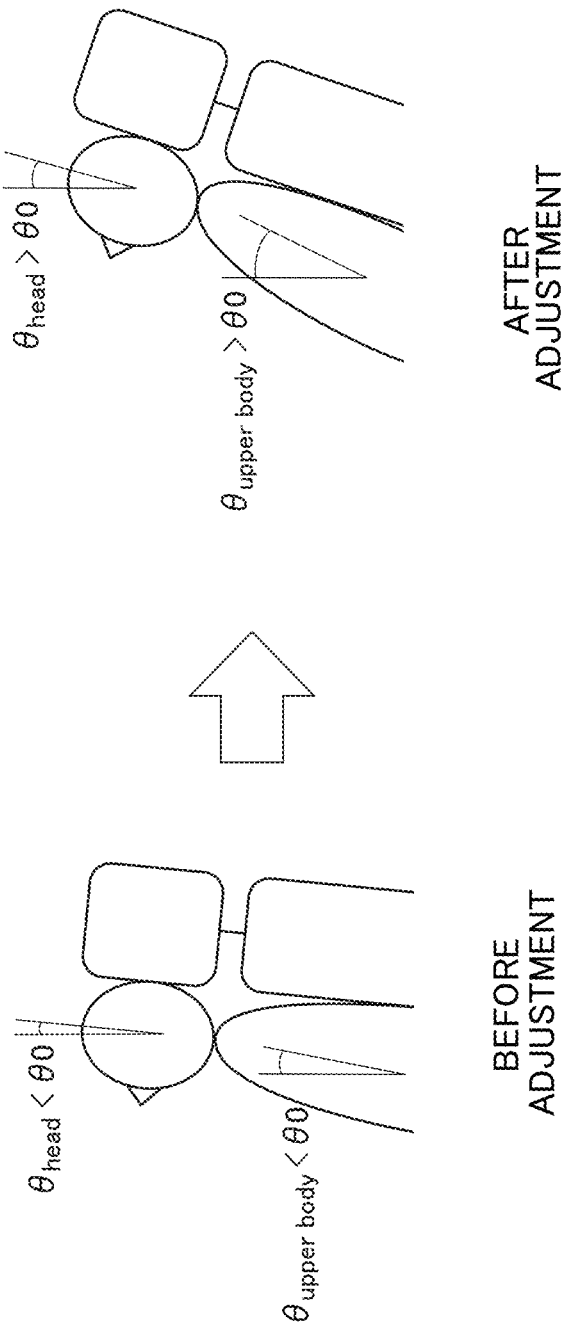
FIG. 8 is a figure showing an example of the posture of an occupant before and after adjustment of angles of the seat.

Because of the above car sickness inhibition process 1, even if, in the seat body 12 before this process is executed, the angles of inclination θhead and θupper_body of the occupant were smaller than the angle of inclination θ0 as indicated by "Before Adjustment" in FIG. 8, the angles of inclination θhead and θupper_body of the occupant are adjusted to become greater than the angle of inclination θ0 as indicated by "After Adjustment" in FIG. 8. Consequently, the head of the occupant is inhibited from separating from the headrest portion 18 when the acceleration a acts thereon, and the occupant may be inhibited from becoming carsick.

Furthermore, because the head of the occupant is inhibited from separating from the headrest portion 18, the occupant does not experience the irritation of his/her head separating from the headrest portion 18 and coming back to it (or hitting it) with every deceleration, and the stability of the posture of the occupant improves. This makes it easier for the occupant to view an automotive display or the like.

In this way, in the first embodiment, the acceleration acquisition unit 50 of the seat ECU 32 acquires the acceleration a in the front-rear direction of the vehicle. Furthermore, the angle-of-inclination computation unit 54 performs the computational process of the expression (1) to obtain, from the acceleration a in the front-rear direction of the vehicle acquired by the acceleration acquisition unit 50, the angle of inclination θ0 with which car sickness is inhibited for the head and upper body of the occupant. Because of this, a condition (that is, the angle of inclination θ with which car sickness is inhibited) for discriminating whether or not the occupant sitting in the seat body 12 of the vehicle will become carsick may be accurately obtained.

Furthermore, in the first embodiment, the acceleration acquisition unit 50 acquires, as the acceleration a, a component of acceleration in the front-rear direction of the vehicle that is equal to or lower than a predetermined frequency. Because of this, a value having a higher correlation with car sickness of the occupant may be obtained as the acceleration a, and the accuracy of the condition for determining whether or not the occupant will become carsick may be improved.

Furthermore, in the first embodiment, the acceleration acquisition unit 50 acquires, as the acceleration a, a component of acceleration in the front-rear direction of the vehicle where the duration of acceleration is equal to or greater than a predetermined amount of time. Because of this, a value having a higher correlation with car sickness of the occupant may be obtained as the acceleration a, and the accuracy of the condition for determining whether or not the occupant will become carsick may be improved.

Furthermore, in the first embodiment, the first estimation unit 52 estimates the angles of inclination θhead and θupper_body of the head and upper body of the occupant sitting in the seat body 12 from the angles φ1, φ2, and φ3 of the seat body 12. Furthermore, the angle-of-inclination computation unit 54 determines whether or not the angles of inclination θhead and θupper_body estimated by the first estimation unit 52 satisfy the expression (1) to which the acceleration a acquired by the acceleration acquisition unit 50 has been assigned. Because of this, the device configuration may be simplified compared to a configuration in which, for example, the angles of inclination θhead and θupper_body are detected with sensors. Additionally, whether or not the estimated angles of inclination θhead and θupper_body are within the range of the angle of inclination θ0 with which car sickness is inhibited may be determined by a simple process.

Furthermore, in the first embodiment, the storage unit 58 stores, as the conversion table 46, the relationships between the angles φ1, φ2, and φ3 of the seat body 12 and the angles of inclination θhead and θupper_body of the head and upper body of the occupant sitting in the seat body 12. Furthermore, the first estimation unit 52 estimates the angles of inclination θhead and θupper_body of the occupant sitting in the seat body 12 from the angles φ1, φ2, and φ3 of the seat body 12 based on the conversion table 46 stored in the storage unit 58. Because of this, the process is simple compared to a case where the relationships between the angles φ1, φ2, and φ3 of the seat body 12 and the angles of inclination θhead and θupper_body of the head and upper body of the occupant sitting in the seat body 12 are prescribed in advance by a computational expression or the like.

Furthermore, in the first embodiment, the seat angle adjustment guidance unit 56 provides guidance for adjustment of the angles of the seat body 12 by the occupant so that the angles of inclination θhead and θupper_body of the occupant sitting in the seat body 12 of the vehicle each become equal to or greater than the angle of inclination θ0 with which car sickness is inhibited obtained by the angle-of-inclination computation unit 54. Because of this, the occupant sitting in the seat body 12 of the vehicle may be inhibited from becoming carsick.

An aspect has been described in the first embodiment where the seat angle adjustment guidance unit 56 provides, by means of audio, guidance for adjustment of the angles of the seat body 12 by the occupant. However, the disclosure is not limited to this, and instead of audio, the seat angle adjustment guidance unit 56 may be configured to provide, by means of a video displayed on the automotive display for example, guidance for adjustment of the angles of the seat body 12.

Second Embodiment

Next, a second embodiment of the disclosure will be described. Parts that are the same as those of the first embodiment are assigned the same reference signs, and description thereof will be omitted.

Figure 9:
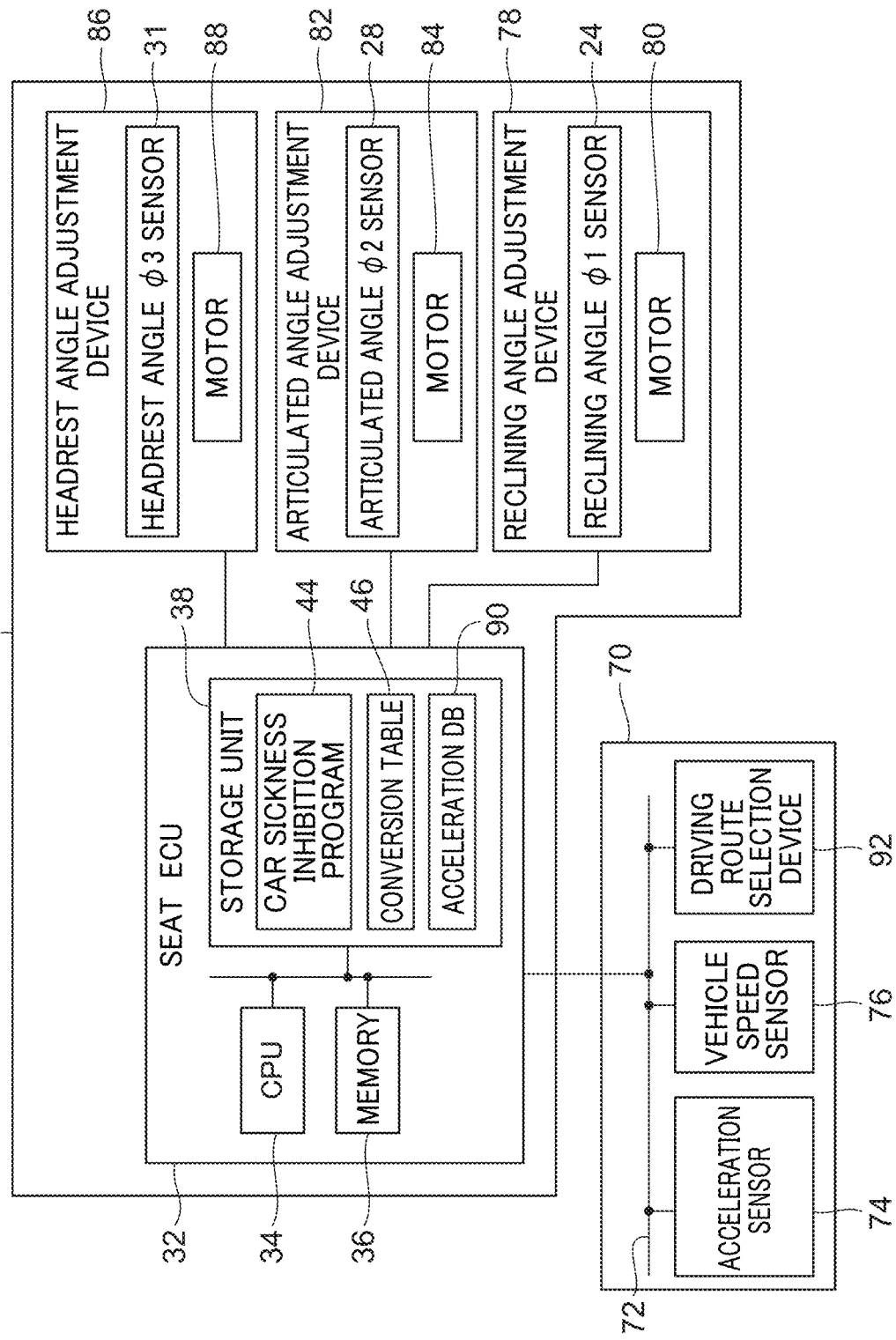
FIG. 9 is a block diagram showing general configurations of the seat ECU and peripherals pertaining to a second embodiment.

As shown in FIG. 9, the seat body 12 is provided with a reclining angle adjustment device 78 instead of the reclining mechanism 22. The reclining angle adjustment device 78 includes the reclining angle φ1 sensor 24 and a motor 80, and the seatback portion 16 is rotated, by driving force of the motor 80, about an axis (the direction of arrow A in FIG. 1) along the vehicle width direction relative to the seat cushion portion 14.

The seat body 12 is also provided with an articulated angle adjustment device 82 instead of the articulating mechanism 26. The articulated angle adjustment device 82 includes the articulated angle φ2 sensor 28 and a motor 84, and the upper portion of the seatback portion 16 is rotated, by driving force of the motor 84, about an axis (the direction of the arrows B in FIG. 1) along the vehicle width direction relative to the lower portion of the seatback portion 16.

The seat body 12 is also provided with a headrest angle adjustment device 86 instead of the headrest mechanism 30. The headrest angle adjustment device 86 includes the headrest angle φ3 sensor 31 and a motor 88, and the headrest portion 18 is rotated, by driving force of the motor 88, about an axis (the direction of arrow C in FIG. 1) along the vehicle width direction relative to the upper portion of the seatback portion 16.

A driving route selection device 92 that selects the route the vehicle will drive is connected to the system bus 72 of the in-vehicle system 70. A typical example of the driving route selection device 92 is a car navigation device that selects a driving route based on the current location of the vehicle and the destination set by the occupant and performs a process to provide navigation so that the vehicle drives along the selected driving route.

In the storage unit 38 (or storage unit 58; see FIG. 10) of the seat ECU 32 is stored an acceleration database (DB) 90. In the acceleration DB 90, acceleration data detected by the acceleration sensor 74 while driving on roads on which the vehicle has driven in the past is associated and stored with information identifying the roads on which the vehicle has driven.

Figure 10:
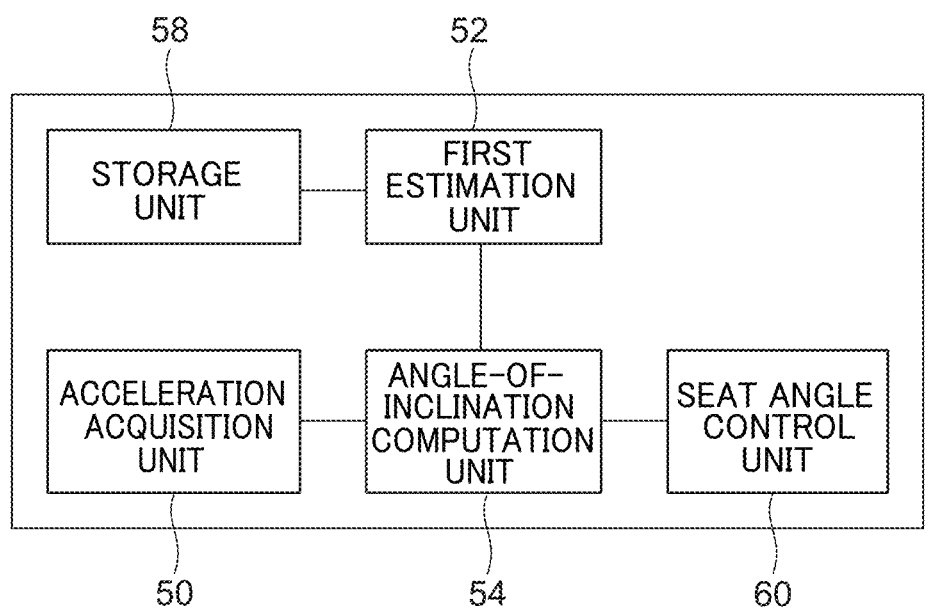
FIG. 10 is a functional block diagram of the seat ECU pertaining to the second embodiment.

In the second embodiment, the seat ECU 32 functions as the functional units shown in FIG. 10 as a result of the car sickness inhibition program 44 pertaining to the second embodiment being read from the storage unit 38 and transferred to the memory 36 and then the car sickness inhibition program 44 that has been transferred to the memory 36 being executed by the CPU 34. That is, in the second embodiment, the seat ECU 32 functions as the acceleration acquisition unit 50, the first estimation unit 52, the angle-of-inclination computation unit 54, and a seat angle control unit 60.

The seat angle control unit 60 controls adjustment of the angles of the seat body 12 by the angle adjustment devices 78, 82, and 86 so that the angles of inclination θhead and θupper_body of the head and the upper body of the occupant sitting in the seat body 12 of the vehicle each become equal to or greater than the angle of inclination θ0 with which car sickness is inhibited obtained by the angle-of-inclination computation unit 54. The seat angle control unit 60 is an example of a control unit in the present disclosure.

Figure 11:
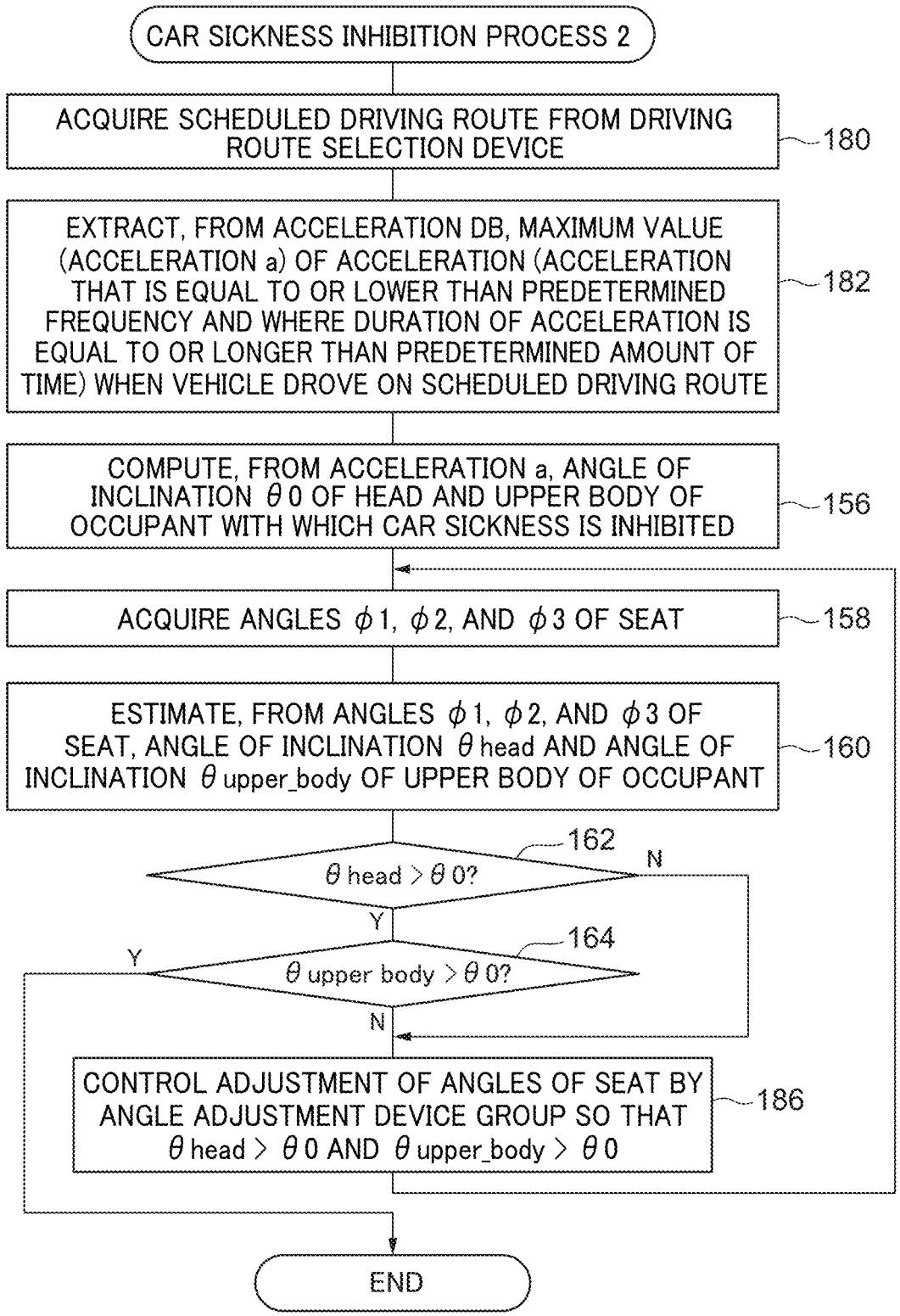
FIG. 11 is a flowchart showing a car sickness inhibition process 2 pertaining to the second embodiment.

Next, a car sickness inhibition process 2 pertaining to the second embodiment will be described with reference to FIG. 11, but only those parts differing from the car sickness inhibition process 1 (FIG. 7) of the first embodiment will be described. In the car sickness inhibition process 2, the processes of steps 180 and 182 are performed instead of steps 150 and 152. That is, in step 180 of the car sickness inhibition process 2, the acceleration acquisition unit 50 acquires, from the driving route selection device 92, a scheduled driving route on which the vehicle is about to drive.

In step 182, the acceleration acquisition unit 50 acquires, from the acceleration DB 90, the acceleration data stored in association with the roads of the scheduled driving route acquired in step 180, that is, the acceleration data detected by the acceleration sensor 74 when the vehicle drove the scheduled driving route in the past. Furthermore, the acceleration acquisition unit 50 extracts, from the acceleration data it has acquired, an acceleration component that is equal to or lower than a predetermined frequency and where the duration of acceleration is equal to or greater than a predetermined amount of time and acquires the maximum value (=acceleration a) of the acceleration component it has extracted.

Furthermore, in the car sickness inhibition process 2 pertaining to the second embodiment, in a case in which the determination in step 162 or step 164 is NO, the process of step 186 is performed instead of step 166. That is, in step 186, the seat angle control unit 60 controls adjustment of the angles of the seat by the angle adjustment devices 78, 82, and 86 so that θhead>θ0 and θupper_body>θ0.

As an example, the seat angle control unit 60 references the conversion table 46 stored in the storage unit 58 and extracts, as target angles, a combination of the angles φ1, φ2, and φ3 of the seat body 12 when the angles of inclination θhead and θupper_body become equal to or greater than the angle of inclination θ0. If more than one combination of the angles φ1, φ2, and φ3 are extracted, it is preferable to select, as the target angles, the combination whose differences from the current angles φ1, φ2, and φ3 of the seat body 12 are as small as possible. Then, the seat angle control unit 60 controls and adjusts the angles of the seat by the angle adjustment devices 78, 82, and 86 so that the angles φ1, φ2, and φ3 of the seat body 12 each become equal to or greater than the target angles.

Because of this, the motors 80, 84, and 88 of the angle adjustment devices 78, 82, and 86 are driven so that the angles φ1, φ2, and φ3 of the seat body 12 each become equal to or greater than the target angles, whereby the head of the occupant is inhibited from separating from the headrest portion 18 when the acceleration a acts thereon, and the occupant may be inhibited from becoming carsick. In the second embodiment, after the determinations in step 162 and step 164 are each YES, the car sickness inhibition process 2 ends.

The second embodiment described above has the following action and effects in addition to the action and effects described in the first embodiment. That is, in the second embodiment, the seat angle control unit 60 controls and adjusts the angles of the seat by the angle adjustment devices 78, 82, and 86 so that the angles of inclination θhead and θupper_body of the occupant sitting in the seat body 12 of the vehicle each become equal to or greater than the angle of inclination θ0 with which car sickness is inhibited obtained by the angle-of-inclination computation unit 54. Because of this, the angles of the seat body 12 are controlled to the angle with which car sickness is inhibited, whereby the occupant sitting in the seat of the vehicle may be inhibited from becoming carsick.

Furthermore, in the second embodiment, the storage unit 58 stores, as the acceleration DB 90 and in association with information representing roads on which the vehicle has driven, acceleration detected when the vehicle drove on those roads. Furthermore, the acceleration acquisition unit 50 acquires the scheduled driving route and acquires, as the acceleration a from the storage unit 58, the acceleration detected when the vehicle drove in the past on the roads on which the vehicle will drive. This makes it possible to control in advance the angles of the seat body 12 to the angle with which car sickness is inhibited before the vehicle actually drives on the roads.

Although the second embodiment has been described where the acceleration DB 90 is stored in the storage unit 38 (the storage unit 58) of the vehicle, the present disclosure is not limited to this. For example, the acceleration DB 90 may also be stored in an external server that receives, from multiple vehicles, acceleration data and information about roads on which the vehicles have driven, and the vehicle may acquire the acceleration data and the like from the acceleration DB 90 stored in the server.

Furthermore, the second embodiment has been described where the acceleration data detected by the acceleration sensor 74 during driving of the vehicle is stored in the database DB 90 in association with the information identifying the roads on which the vehicle has driven, but the present disclosure is not limited to this. For example, representative values of acceleration may be found for different traffic conditions (e.g., congested roads, residential areas, etc.) based on acceleration detected by the acceleration sensor 74 during driving of the vehicle, and the representative values may be stored in the DB. In this case, for example, the traffic conditions may be determined from images that have captured what is in front of the vehicle, and representative values of acceleration corresponding to the traffic conditions that have been determined may be read from the DB and used. Furthermore, the traffic conditions are not limited to being determined from images of what is in front of the vehicle and may also be acquired from an external server or the like.

Third Embodiment

Next, a third embodiment of the present disclosure will be described. Parts that are the same as those of the first embodiment are assigned the same reference signs, and detailed description thereof will be omitted.

Figure 12:
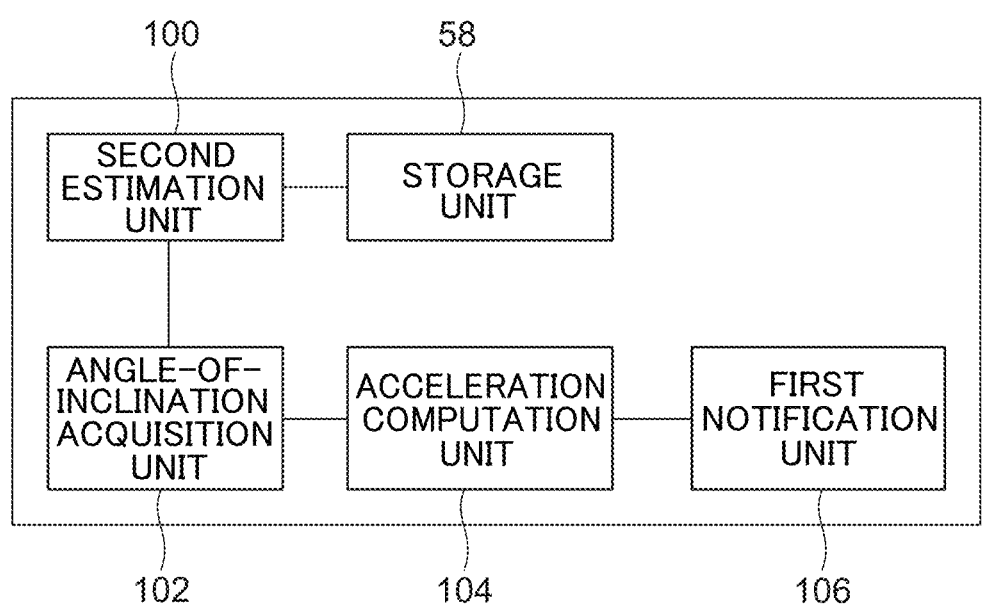
FIG. 12 is a functional block diagram of the seat ECU pertaining to a third embodiment.

In the third embodiment, the seat ECU 32 functions as the functional units shown in FIG. 12 as a result of the car sickness inhibition program 44 pertaining to the third embodiment being read from the storage unit 38 and loaded to the memory 36 and then the car sickness control program 44 that has been loaded to the memory 36 being executed by the CPU 34. That is, in the third embodiment, the seat ECU 32 functions as a second estimation unit 10, an angle-of-inclination acquisition unit 102, an acceleration computation unit 104, and a first notification unit 106.

The second estimation unit 100 acquires the angles of the seat body 12 (i.e., the reclining angle φ1, the articulated angle φ2, and the headrest angle φ3) and estimates, from the angles of the seat body 12 it has acquired, the angles of inclination θhead and θupper_body of the occupant sitting in the seat body 12. The estimation of the angles of inclination θhead and θupper_body by the second estimation unit 100 is performed based on the conversion table 46 stored in the storage unit 58.

The angle-of-inclination acquisition unit 102 acquires, from the second estimation unit 100, the angles of inclination θhead and θupper_body of the head and upper body of the occupant sitting in the seat body 12 of the vehicle. The angle-of-inclination acquisition unit 102 is an example of an acquisition unit in the present disclosure. The acceleration computation unit 104 performs the computational process of expression (1) to obtain, from the angles of inclination θhead and θupper_body acquired by the angle-of-inclination acquisition unit 102, an acceleration a0 with which car sickness is inhibited. The acceleration computation unit 104 is an example of a computation unit in the present disclosure.

The first notification unit 106 issues a notification, by means of audio via the audio output unit 42, when acceleration in the front-rear direction of the vehicle being driven by the occupant is greater than the acceleration a0 with which car sickness is inhibited obtained by the acceleration computation unit 104. Instead of issuing the notification by means of audio, the first notification unit 106 may, for example, issue the notification by displaying a message or the like on the automotive display.

Figure 13:
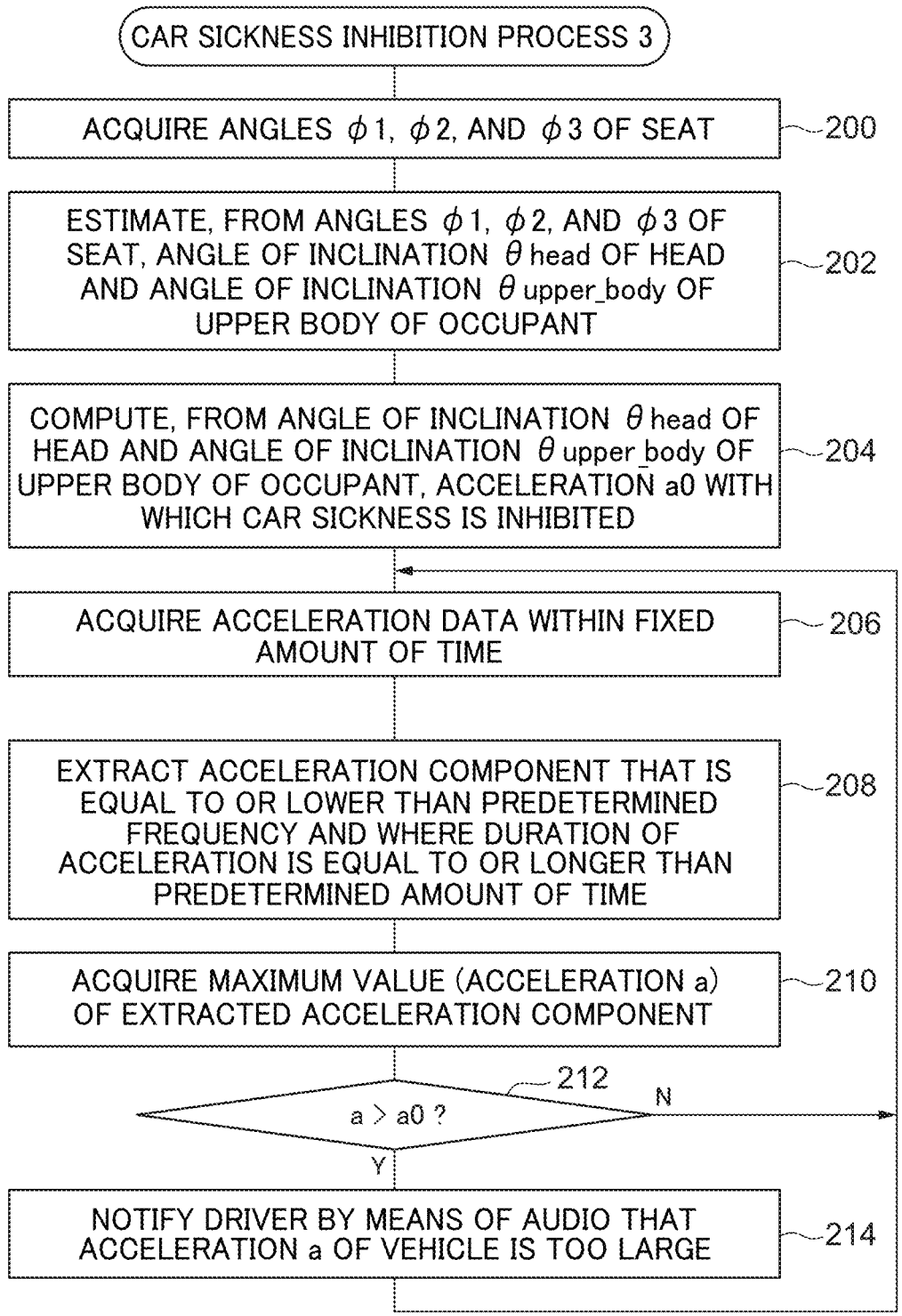
FIG. 13 is a flowchart showing a car sickness inhibition process 3 pertaining to the third embodiment.

Next, a car sickness inhibition process 3 pertaining to the third embodiment will be described with reference to FIG. 13. In step 200 of the car sickness inhibition process 3, the second estimation unit 100 acquires, from the seat ECU 32, the reclining angle $\varphi 1$, the articulated angle $\varphi 2$, and the headrest angle $\varphi 3$ of the seat body 12.

In step 202, the second estimation unit 100 estimates the angles of inclination $\theta$head and $\theta$upper_body of the occupant from the angles $\varphi 1$, $\varphi 2$, and $\varphi 3$ of the seat body 12 acquired in step 200. This estimation of the angles of inclination $\theta$head and $\theta$upper_body is performed by reading, from the conversion table 46 stored in the storage unit 58, the angles of inclination $\theta$head and $\theta$upper_body associated with the angles $\varphi 1$, $\varphi 2$, and $\varphi 3$ of the seat body 12.

In step 204, the acceleration computation unit 104 assigns the angle of inclination $\theta$head of the head of the occupant to expression (1) and performs the computational process of expression (1) to obtain an acceleration a0_head with which car sickness is inhibited. The acceleration computation unit 104 also assigns the angle of inclination $\theta$upper_body of the upper body of the occupant to expression (1) and performs the computational process of expression (1) to obtain an acceleration a0_upper_body with which car sickness is inhibited. Then, the acceleration computation unit 104 sets the smaller of the acceleration a0_head and the acceleration a0_upper_body to the acceleration a0 with which car sickness is inhibited.

In step 206, the first notification unit 106 acquires acceleration data within a fixed amount of time from the acceleration sensor 74. In step 208, the first notification unit extracts, from the acceleration data acquired in step 206, an acceleration component that is equal to or lower than a predetermined frequency and where the duration of acceleration is equal to or greater than a predetermined amount of time. Then, in step 210, the first notification unit 106 acquires the maximum value (=acceleration a) of the acceleration component extracted in step 208.

In step 212, the first notification unit 106 determines whether or not the acceleration a acquired in step 210 is greater than the acceleration a0 with which car sickness is inhibited computed by the acceleration computation unit 104. In a case in which the determination in step 212 is YES, it is judged that there is the potential for the occupant to become carsick, so the process moves to step 214.

In step 214, the first notification unit 106 notifies the driver, by means of audio via the audio output unit 42, that the acceleration a of the vehicle is too large. As an example, the audio might say, "There is the potential for carsickness, so please try to drive with moderate acceleration." This induces the driver to drive the vehicle so that acceleration in the front-rear direction of the vehicle becomes less than the acceleration a0, so the occupant sitting in the seat body 12 of the vehicle may be inhibited from becoming carsick.

On the other hand, in a case in which the determination in step 212 is NO, it is judged that there is little potential for the occupant to become carsick, so the process skips step 214 and returns to step 206.

In this way, in the third embodiment, the angle-of-inclination acquisition unit 102 of the seat ECU 32 acquires the angles of inclination $\theta$head and $\theta$upper_body of the head and upper body of the occupant sitting in the seat body 12 of the vehicle. Furthermore, the acceleration computation unit 104 performs the computational process of the expression (1) to obtain, from the angles of inclination $\theta$head and $\theta$upper_body acquired by the angle-of-inclination acquisition unit 102, the acceleration a0 with which car sickness is inhibited. Because of this, a condition (that is, the acceleration a0 with which car sickness is inhibited) for discriminating whether or not the occupant sitting in the seat body 12 of the vehicle will become carsick may be accurately obtained.

Furthermore, in the third embodiment, the second estimation unit 100 acquires the angles $\varphi 1$, $\varphi 2$, and $\varphi 3$ of the seat body 12 and estimates, from the angles $\varphi 1$, $\varphi 2$, and $\varphi 3$ of the seat body 12 it has acquired, the angles of inclination $\theta$head and $\theta$upper_body of the occupant sitting in the seat body 12. Then, the angle-of-inclination acquisition unit 102 acquires, from the second estimation unit 100, the angles of inclination $\theta$head and $\theta$upper_body of the occupant sitting in the seat body 12. Because of this, the device configuration may be simplified compared to an aspect where, for example, the angles of inclination $\theta$head and $\theta$upper_body are detected with sensors.

Furthermore, in the third embodiment, the storage unit 58 stores, as the conversion table 46, the relationships between the angles $\varphi 1$, $\varphi 2$, and $\varphi 3$ of the seat body 12 and the angles of inclination $\theta$head and $\theta$upper_body of the occupant sitting in the seat body 12. The second estimation unit 100 estimates the angles of inclination $\theta$head and $\theta$upper_body of the occupant sitting in the seat body 12 from the angles $\varphi 1$, $\varphi 2$, and $\varphi 3$ of the seat body 12 based on the conversion table 46 stored in the storage unit 58. Because of this, the process is simple compared to a case where the relationships between the angles $\varphi 1$, $\varphi 2$, and $\varphi 3$ of the seat body 12 and the angles of inclination $\theta$head and $\theta$upper_body of the occupant sitting in the seat body 12 are prescribed in advance by a computational expression or the like.

Furthermore, in the third embodiment, the first notification unit 106 issues a notification in a case in which acceleration in the front-rear direction of the vehicle being driven by the occupant is greater than the acceleration a0 with which car sickness is inhibited obtained by the acceleration computation unit 104. This induces the driver to drive the vehicle so that acceleration in the front-rear direction of the vehicle becomes less than the acceleration a0, and the occupant sitting in the seat of the vehicle may be inhibited from becoming carsick.

Fourth Embodiment

Next, a fourth embodiment of the present disclosure will be described. Parts that are the same as those of the first embodiment to the third embodiment are assigned the same reference signs, and detailed description thereof will be omitted.

Figure 14:
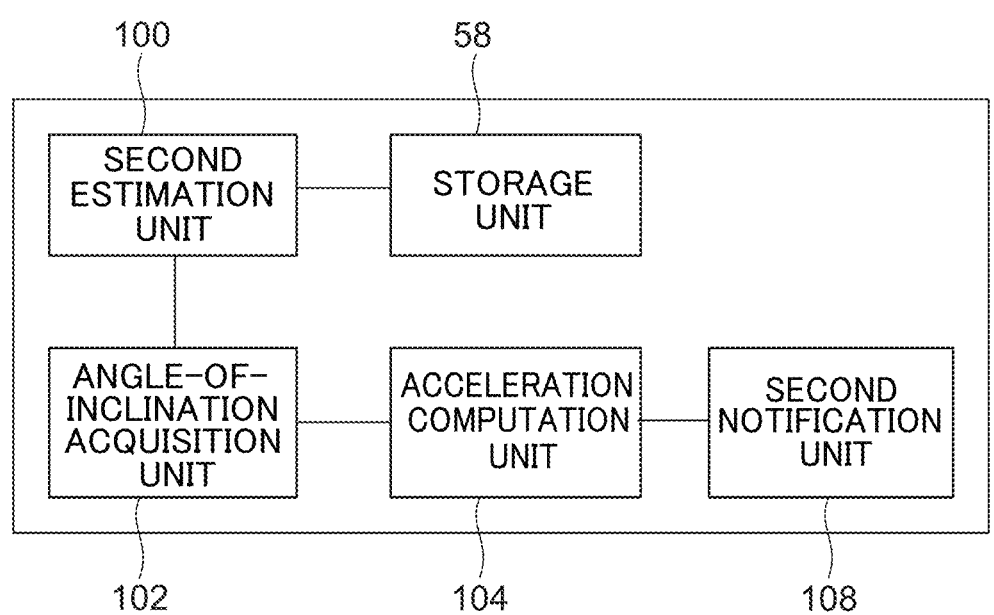
FIG. 14 is a functional block diagram of the seat ECU pertaining to a fourth embodiment.

In the fourth embodiment, the seat ECU 32 functions as the functional units shown in FIG. 14 as a result of the car sickness inhibition program 44 pertaining to the fourth embodiment being read from the storage unit 38 and loaded to the memory 36 and then the car sickness inhibition program 44 that has been loaded to the memory 36 being executed by the CPU 34. That is, in the fourth embodiment, the seat ECU 32 functions as the second estimation unit 100, the angle-of-inclination acquisition unit 102, the acceleration computation unit 104, and a second notification unit 108.

The second notification unit 108 notifies the driving route selection device 92 of the acceleration a0 with which car sickness is inhibited obtained by the acceleration computation unit 104 so that a driving route where acceleration in the front-rear direction of the vehicle during driving becomes equal to or less than the acceleration a0 with which car sickness is inhibited is selected as the driving route of the vehicle.

Next, a car sickness inhibition process 4 pertaining to the fourth embodiment will be described with reference to FIG. 15, but only those parts differing from the car sickness inhibition process 3 (FIG. 13) described in the third embodiment will be described. Step 200 to step 204 are the same as those in the third embodiment. In the next step 220, the acceleration computation unit 104 acquires, from the driving route selection device 92, the scheduled driving route on which the vehicle is about to drive.

In step 222, the acceleration computation unit 104 acquires, from the acceleration DB 90, the acceleration data stored in association with the roads of the scheduled driving route acquired in step 220, that is, the acceleration data detected by the acceleration sensor 74 when the vehicle drove the scheduled driving route in the past. The acceleration computation unit 104 also extracts, from the acceleration data it has acquired, an acceleration component that is equal to or lower than a predetermined frequency and where the duration of acceleration is equal to or greater than a predetermined amount of time, and acquires the maximum value (=acceleration a) of the acceleration component it has extracted.

In step 212, the second notification unit 108 determines whether or not the acceleration a acquired in step 222 is greater than the acceleration a0 with which car sickness is inhibited computed in step 204. In a case in which the determination in step 212 is YES, it is judged that the potential is high that the occupant will become carsick, so the process moves to step 224.

In step 224, the second notification unit 108 requests a revision of the scheduled driving route by notifying the driving route selection device 92 of the acceleration a0 with which car sickness is inhibited. Because of this, the driving route selection device 92 revises the scheduled driving route to, for example, a route that avoids congested roads and temporary stops in which a large acceleration is likely occur during driving, and thereby selects a driving route where acceleration in the front-rear direction of the vehicle during driving will become less than the acceleration a. Because of this, the occupant sitting in the seat body 12 of the vehicle may be inhibited from becoming carsick. In a case in which the determination in step 212 is NO, it is judged that the potential is low that the occupant will become carsick, so the car sickness inhibition process 4 ends.

The fourth embodiment described above has the following action and effects in addition to the action and effects described in the third embodiment. That is, in the fourth embodiment, the second notification unit 108 notifies the driving route selection device 92 of the acceleration a0 with which car sickness is inhibited obtained by the acceleration computation unit 104 so that a driving route where acceleration in the front-rear direction of the vehicle during driving becomes equal to or less than the acceleration a0 with which car sickness is inhibited is selected as the driving route of the vehicle. Because of this, the occupant sitting in the seat of the vehicle may be inhibiting from becoming carsick.

It will be noted that the seat body 12 may also have a configuration where it is rotatable so as to face backward. In a case where the occupant faces backward, the computation is performed using acceleration at the time of acceleration instead of acceleration at the time of deceleration.

Furthermore, configurations have been described above where the present disclosure is applied to a front passenger seat of a vehicle, but the present disclosure is not limited to this. For example, the present disclosure may also be applied to a rear seat of a vehicle, and the vehicle seat pertaining to the present disclosure may be plurally provided in one vehicle.

Furthermore, aspects were described above where the car sickness inhibition program 44 that is an example of the car sickness inhibition program pertaining to the present disclosure is stored (installed) beforehand in the storage unit 38, but the car sickness inhibition program pertaining to the present disclosure may also be provided in a form in which it is recorded in a nonvolatile recording medium such as an HDD, SSD, or DVD.

What is claimed is:

1. A car sickness inhibition device comprising:
a memory and
a processor connected to the memory, the processor being configured to:
acquire an acceleration a in a front-rear direction of a vehicle or angles of inclination θ of the head and upper body of an occupant sitting in a seat of the vehicle; and
by using expression (1) below, $$\theta > \tan^{-1}(a/g) \quad (1)$$

where g denotes gravitational acceleration, obtain an angle of inclination θ0 with which car sickness is inhibited by assigning the acquired acceleration a into the expression (1), or obtain an acceleration a0 with which the car sickness is inhibited by assigning the acquired angles of inclination θ into the expression (1),
wherein the processor is further configured to control adjustment of angles of the seat by seat angle adjustment devices so that the angles of inclination θ of the head and upper body of the occupant sitting in the seat of the vehicle each become equal to or greater than the obtained angle of inclination θ0 with which the car sickness is inhibited.

2. The car sickness inhibition device of claim 1, wherein the processor is configured to acquire, as the acceleration a, a component of acceleration in the front-rear direction of the vehicle that is equal to or lower than a predetermined frequency.

3. The car sickness inhibition device of claim 1, wherein the processor is configured to acquire, as the acceleration a, a component of acceleration in the front-rear direction of the vehicle where the duration of acceleration is equal to or greater than a predetermined amount of time.

4. The car sickness inhibition device of claim 1, wherein the processor is further configured to:
estimate the angles of inclination θ of the occupant sitting in the seat from angles of the seat, and
determine whether or not the estimated angles of inclination θ satisfy the expression (1) to which the acquired acceleration a has been assigned.

5. The car sickness inhibition device of claim 4, further comprising a storage unit that stores relationships between the angles of the seat and the angles of inclination θ of the head and upper body of the occupant sitting in the seat,
wherein the processor is configured to estimate the angles of inclination θ of the occupant sitting in the seat from the angles of the seat based on information stored in the storage unit.

6. The car sickness inhibition device of claim 1, wherein the processor is further configured to:
acquire angles of the seat, and
acquire the angles of inclination θ of the occupant sitting in the seat by estimating the angles of inclination θ of the occupant sitting in the seat from the acquired angles of the seat.

7. The car sickness inhibition device of claim 6, further comprising a storage unit that stores relationships between angles of the seat and the angles of inclination θ of the head and upper body of the occupant sitting in the seat,
wherein the processor is configured to estimate the angles of inclination θ of the occupant sitting in the seat from the angles of the seat based on information stored in the storage unit.

8. The car sickness inhibition device of claim 1, wherein the processor is further configured to issue a notification in a case in which acceleration in the front-rear direction of the vehicle being driven by the occupant is greater than the obtained acceleration a0 with which car sickness is inhibited.

9. A vehicle seat comprising:
a seat body in which an occupant of a vehicle sits; and
the car sickness inhibition device of claim 1.

10. A car sickness inhibition method performed by the car sickness inhibition device according to claim 1, the method comprising:
acquiring an acceleration a in a front-rear direction of a vehicle or angles of inclination θ of the head and upper body of an occupant sitting in a seat of the vehicle; and by using expression (1) below, $$\theta > \tan^{-1}(a/g) \tag{1}$$

where g denotes gravitational acceleration, obtaining an angle of inclination θ0 with which the car sickness is inhibited by assigning the acquired acceleration a into the expression (1), or obtaining an acceleration a0 with which the car sickness is inhibited by assigning the acquired angles of inclination θ into the expression (1).

11. A non-transitory storage medium storing a program that causes the car sickness inhibition device according to claim 1 to execute a car sickness inhibition processing, the car sickness inhibition processing comprising:
acquiring an acceleration a in a front-rear direction of a vehicle or angles of inclination θ of the head and upper body of an occupant sitting in a seat of the vehicle; and by using expression (1) below, $$\theta > \tan^{-1}(a/g) \tag{1}$$

where g denotes gravitational acceleration, obtaining an angle of inclination θ0 with which the car sickness is inhibited by assigning the acquired acceleration a into the expression (1), or obtaining an acceleration a0 with which the car sickness is inhibited by assigning the acquired angles of inclination θ into the expression (1).

12. A car sickness inhibition device comprising:
a memory and
a processor connected to the memory, the processor being configured to:
acquire an acceleration a in a front-rear direction of a vehicle or angles of inclination θ of the head and upper body of an occupant sitting in a seat of the vehicle; and by using expression (1) below, $$\theta > \tan^{-1}(a/g) \tag{1}$$

where g denotes gravitational acceleration, obtain an angle of inclination θ0 with which car sickness is inhibited by assigning the acquired acceleration a into the expression (1), or obtain an acceleration a0 with which the car sickness is inhibited by assigning the acquired angles of inclination θ into the expression (1),
wherein the processor is further configured to output audio to provide guidance for adjustment of angles of the seat by the occupant so that the angles of inclination θ of the head and upper body of the occupant sitting in the seat of the vehicle each become equal to or greater than the obtained angle of inclination θ0 with which the car sickness is inhibited.

13. A car sickness inhibition device comprising:
a memory and
a processor connected to the memory, the processor being configured to:
acquire an acceleration a in a front-rear direction of a vehicle or angles of inclination θ of the head and upper body of an occupant sitting in a seat of the vehicle; and by using expression (1) below, $$\theta > \tan^{-1}(a/g) \tag{1}$$

where g denotes gravitational acceleration, obtain an angle of inclination θ0 with which car sickness is inhibited by assigning the acquired acceleration a into the expression (1), or obtain an acceleration a0 with which the car sickness is inhibited by assigning the acquired angles of inclination θ into the expression (1),
wherein the processor is further configured to notify a driving route selection device of the acceleration a0 with which the car sickness is inhibited so that a driving route where acceleration in the front-rear direction of the vehicle during driving becomes equal to or less than the acceleration a0 with which the car sickness is inhibited is selected as the driving route of the vehicle.

* * * * *